United States Patent [19]

Burleigh

[11] 3,952,966

[45] Apr. 27, 1976

[54] SEAT BELT STORAGE REEL WITH ELECTRICALLY OPERATED LOCKING DEVICE

[75] Inventor: David William Burleigh, Yateley, England

[73] Assignee: Britax (London) Limited, Byfleet, England

[22] Filed: May 3, 1974

[21] Appl. No.: 466,795

[30] Foreign Application Priority Data
May 4, 1973 United Kingdom............... 21290/73

[52] U.S. Cl.................... 242/107.4 R; 200/61.58 B
[51] Int. Cl.²...................... B65H 75/48; H01H 3/16
[58] Field of Search.................. 242/107.4, 107.5 B; 200/52 A, 61.44, 61.45 R, 61.58 B

[56] References Cited
UNITED STATES PATENTS

| | | | |
|---|---|---|---|
| 3,578,260 | 5/1971 | Keil.................................. | 242/107.4 |
| 3,740,000 | 6/1973 | Takada............................ | 242/107.4 |
| 3,825,205 | 7/1974 | Takada............................ | 242/107.4 |
| 3,831,878 | 8/1974 | Griffin.............................. | 242/107.4 |

*Primary Examiner*—Leonard D. Christian
*Attorney, Agent, or Firm*—Baldwin, Wight & Brown

[57] ABSTRACT

The present invention comprises an electrically operated safety belt storage reel including a spindle on which a length of safety belt webbing may be wound, the reel being of the type which is for fitting in a vehicle and the webbing of which may be increased or decreased in length by pulling on the webbing to unwind it from the spindle thereby allowing movement of the person wearing the belt during normal operating conditions of the vehicle, biassing means biassing the spindle so as normally to wind in a length of webbing mounted on the spindle, a locking member associated with the spindle so that when the locking member is in a locking position, rotation of the spindle is prevented thereby preventing unwinding of the webbing from the spindle, electrical means associated with the locking means for moving the latter between locking and unlocking positions, dependent upon a supply of electrical energy to the electrical means and including at least one non-magnetic barrier associated with the locking means to minimise remanence in the locking means subsequent to the supply of electrical energy to the electrical means. The non-magnetic barrier may comprise a sleeve on the pawl or may be in two parts. The invention also relates to a safety belt storage reel provided with a double locking pawl and toothed wheel to prevent jamming and to ensure satisfactory locking and to the provision of a mechanical release device in such a reel.

17 Claims, 5 Drawing Figures

SEAT BELT STORAGE REEL WITH ELECTRICALLY OPERATED LOCKING DEVICE

This invention relates generally to storage reels for safety belts and more particularly to means for locking the storage reel against belt withdrawal. In particular, the invention is concerned with electrically operated locking means which may be actuated by mechanical switching or an inertia operated device. It will be appreciated that the locking means can be used just to lock a single storage reel for one belt or a plurality of reels for all the seat belts in a vehicle. Furthermore, it will be appreciated that the above described safety apparatus can be employed in any vehicle where seat belts or harnesses are to be fitted and it is particularly useful in motor vehicles Such safety apparatus is nowadays known as automatically operated apparatus and it can take many forms. Normally, however, a length of seat belt webbing is stored upon a reel and can be withdrawn from the reel against a spring bias for fitting round an occupant of a seat and held in such position by means of a suitable buckle connected either to another buckle part or to a fixing on the frame of the vehicle. Under normal vehicle operating conditions, the reel will allow the belt webbing to be withdrawn from the reel to permit the seat occupant to move about but when the vehicle is subjected to extreme conditions of deceleration or acceleration or inclination, i.e. to potential hazard conditions, the safety apparatus prevents the webbing from being withdrawn and holds the seat occupant in his seat. Such safety apparatus is usually either sensitive to rapid acceleration of webbing withdrawal from the reel and/or to rapid vehicle acceleration, deceleration or inclination.

It is known to include electrical means to assist in operation of the safety apparatus and in the electrical circuit to provide a switch which can be operated, for example, by the vehicle ignition or by the presence of an occupant in a seat of the vehicle or by closing of the vehicle door.

The present invention seeks to provide a safety belt storage reel which is electrically operated and which can be locked with the minimum of time delay whenever locking of the reel is required to prevent belt withdrawal. The invention is also concerned with means for ensuring satisfactory locking of the storage reel against belt withdrawal and with a device for freeing the reel in the event of an electrical fault.

According to the present invention, we provide an electrically operated safety belt storage reel including a spindle on which a length of webbing belt webbinb may be wound, the reel being of the type which is for fitting in a vehicle and the webbing of which may be increased or decreased in length by pulling on the webbing to unwind it from the spindle, thereby allowing movement of the person wearing the belt during normal operating conditions of the vehicle, biassing means biassing the spindle so as normally to wind in a length of webbing mounted on the spindle, a locking member associated with the spindle so that when the locking member is in a locking position, rotation of the spindle is prevented, thereby preventing unwinding of the webbing from the spindle, electrical means associated with the locking means for moving the latter between locking and unlocking positions, dependent upon a supply of electrical energy to the electrical means and including at least one non-magnetic barrier associated with the locking means to minimise remanence in the locking means subsequent to the supply of electrical energy to the electrical means.

Preferably, the spindle has a toothed wheel rotatable therewith and the locking means comprises a locking pawl movable into and out of engagement with the teeth of said toothed wheel, and the electrical means is a coil and the non-magnetic barrier may comprise a cover sleeve on the arm of the locking pawl. Alternatively, however, the non-magnetic barrier may be in two parts, one on a face of the pawl facing the toothed wheel, and the other either on an opposite face of the pawl, facing the coil, or arranged over the end of the coil facing the pawl. In the latter case, it may be in the form of a disc adhesively secured to said end or in the form of a self-retaining cap. The non-magnetic barrier (s) is/are preferably formed of rubber but may be of a plastic material.

Preferably, the locking means is fail safe and hence the pawl is spring biassed into locking engagement with the toothed wheel and is moved out of locking engagement therewith upon electrical energy being supplied to the coil.

Preferably, the coil of the electrically operated reel is arranged in an electrical circuit which includes an inertia operated switch such as a mercury switch, the inertia operated switch being of the type which is actuated upon sudden acceleration, deceleration, or tilting of a vehicle in which the switch is mounted.

Preferably, the switch is normally closed and said acceleration, deceleration or tilting movement causes said switch to be opened.

Preferably, the electrical circuit includes a master switch which may be operated by the presence of a person in the driver's seat of a vehicle, operation of a vehicle ignition switch, closing of a vehicle's door or in other known manner.

Furthermore, the circuit may include a further switch therein operated by depression of a vehicle's brake pedal immediately to break the circuit thereby ensuring locking of the real against belt withdrawal prior to the vehicle experiencing rapid deceleration.

It is preferred that the foot brake actuated switch has means associated therewith dependent upon the speed of the vehicle such that below a predetermined speed, operation of the vehicle's foot brake is ineffective to break the circuit to lock the reel.

It is envisaged that instead of one coil of a single safety belt reel being incorporated in the electrical circuit described above, several reels may be incorporated in the circuit and in the case of a motor vehicle fitted with two reels for the front seat passengers and two reels for the back seat passengers, the coils of all four reels could be incorporated in the same circuit.

Although it is perferred that the reels are of the fail safe type, i.e. are locked against belt withdrawal unless electrical energy is supplied to the electrical means, it is envisaged that other systems could be used.

It should also be appreciated that the reels may include further built-in safety mechanisms such as a locking mechanism responsive to sudden unwinding of the webbing from the spindle.

Furhtermore, of course, the present invention is not limited to storage reels of the type including a toothed wheel and a locking pawl. Many other types of locking mechanism are known, and it is envisaged that the non-magnetic barrier(s) feature of the present invention could be incorporated in most of these known types of locking mechanism when activated or deactivated by electrical means.

In a particular embodiment of this invention, we provide a safety belt storage reel, which may have any one or more of the aforementioned features, and which includes a double toothed or ratchet wheel fast with the reel spindle, and a double locking pawl associated with it. The main pawl and toothed wheel are thus complemented by a secondary pawl and toothed wheel, the secondary pawl projecting from the main one, and being so constructed as to lead the main pawl into correct locking engagement with the main wheel, and thus prevent edge engagement, i.e. engagement of the main pawl with an edge portion only of a tooth of the main wheel. A rear surface of the secondary pawl acts as a cam engaging the secondary wheel and only allows engagement of the main pawl when the main wheel is so oriented as to make edge engagement impossible. It is also so shaped that once engaged, it will pull the main pawl into firm engagement of a tooth of the main wheel under load.

If the secondary pawl is made of a resiliently deformable plastics material, it is preferably so constructed and oriented relative to the main pawl that when engaged with its secondary wheel the main pawl and wheel will be meshing with each other, but not actually engaged, i.e. bearing any load. This means there is virtually silent engagement. Once a load is experienced by the reel, i.e. the belt is tensioned, the secondary pawl will deform, thereby causing engagement of the main pawl (at low speed and hence quietly).

Preferably, the storage reel incorporated a mechanical release device to release the reel from a locked condition in the event of it becoming accidentally locked, e.g. if there is an electrical failure. This may comprise a plunger mounted in the casing of the reel, adjacent the coil and locking pawl, and having an arm engageable with the pawl, on depression of the plunger, to release the pawl, against its spring bias, thus permitting belt withdrawal. This means that if the electrical part of the reel breaks down, it is still possible to use the belt as a spring loaded static belt. It is envisaged that this feature could be incorporated in any electrically operated reel, and not only that herein described.

The present invention is now described with reference to the accompanying drawings, in which.

Figure 1:
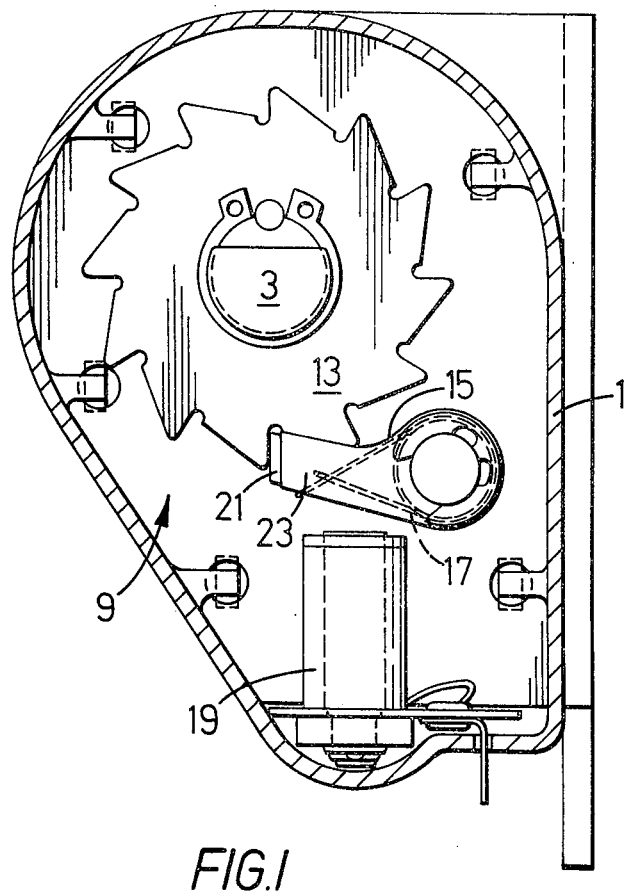
FIG. 1 is a side view of an electrically operated safety belt storage reel with casing parts removed.
Figure 2:
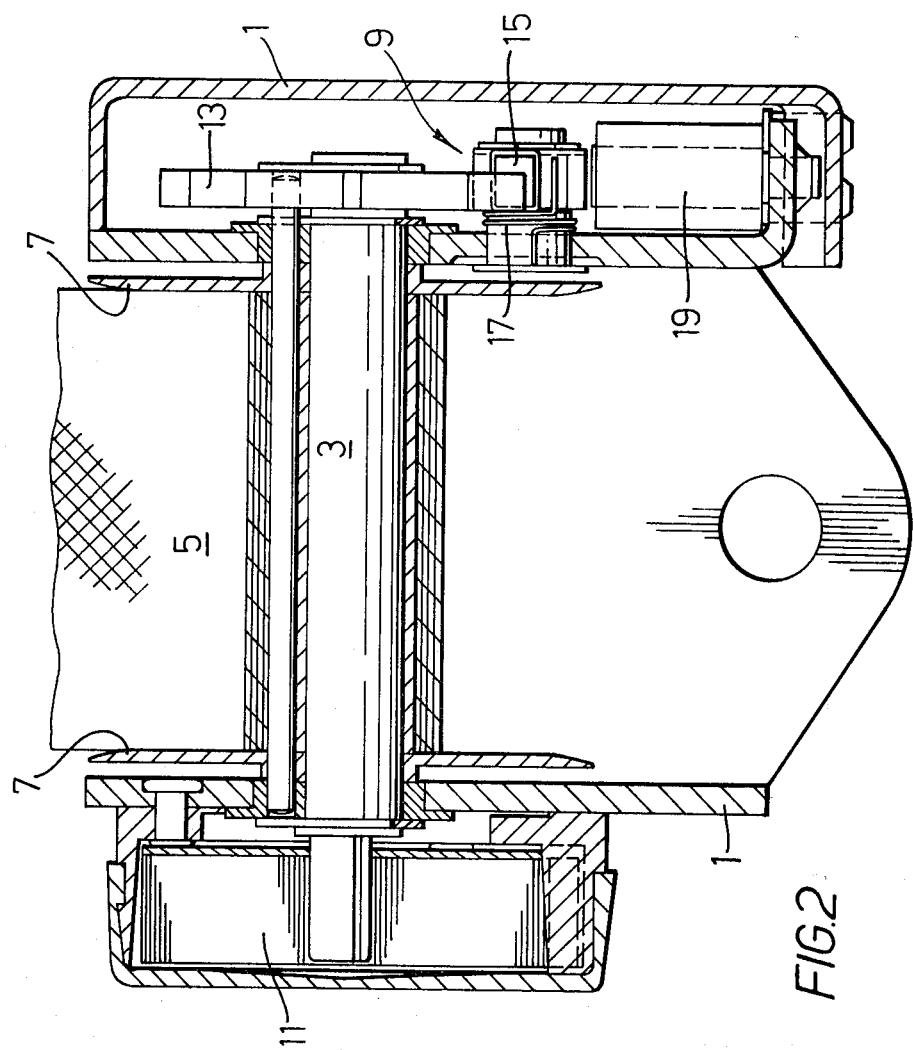
FIG. 2 is a sectiona view of the reel.

Referring to FIGS. 1 and 2, the reel includes a casing 1 for attachment to the frame of a vehicle and in which a 1 for attachment tothe frame of a vehicle and in which a spindle 3 is rotatably mounted and on which a length of webbing 5 for a safety belt is wound, the webbing being supported by side flanges 7. A locking mechanism for locking the spindle 3 against rotation and hence against webbing withdrawal is indicated generally at 9 at one end of the spindle 3. At the other end of the spindle, a spring 11 is provided in a suitable spring container, the spring 11 having one end connected to the spindle 3 and biassing the spindle 3 for rotation about a central axis in a direction for winding in the webbing 5 on the spindle. It will thus be appreciated that unwinding of the webbing 5 from the spindle 3 will be against the bias provided by the spring 11.

The webbing 5 is connected to the spindle 3 in known manner and the spindle 3 is journalled in the housing 1 in suitable bearings in known manner.

The locking mechanism 9 includes a ratchet wheel 13 fast with the spindle 3 for rotation therewith and a locking pawl 15 mounted for rocking movement in the casing 1 in known manner, the locking pawl 15 being spring biased into locking engagement with the teeth of the toothed wheel 13 in known manner by a pawl spring 17, or any other known type of spring. An electrical coil 19 is supported by the casing 1 for withdrawing the pawl 15 from the locking position shown in FIG. 1 to a withdrawn unlocked position. Hence, when electrical energy is supplied to the coil 19, a magnetic field is set up, the effect of which is to move the arm portion 21 of the pawl 15 out of the position shown in FIG. 1 to the withdrawn unlocked position. The pawl 15 would normally be made of a hard metal and to prevent remanence in the pawl, the arm portion 21 is surrounded by a non-conductive sleeve 23, preferably a plastics sleeve.

When there is a flow of electrical energy to the coil 19, flux is induced in the core of the coil and the pawl 15 and if there is a metal to metal contact between the core of the coil 19 and the arm 21 of the pawl, residual flux in the two parts takes a significant time to disperse. However, by providing the non-conductive sleeve 23 around the arm portion 21, a constant non-magnetic gap or barrier is formed between the two metal parts which has the effect of very greatly reducing the flux density in the adjacent parts of the core and pawl. This speeds up the dispersal of the residual flux and allows the locking mechanism to operate extremely rapidly in relation to the electrical inputs to the coil 19, thereby speeding up operation of the locking mechanism.

Apart from preventing remanence, the plastic sleeve 23 has the additional advantage of making the reel quieter during operation. In known reels which use a pawl to lock them against webbing withdrawal, the arm 21 of the locking pawl runs up the inclined surface of each tooth of the wheel 13 whenever the safety belt webbing 5 is wound back onto the reel under the bias of the spring 11. When the pawl moves off the peak of one tooth and down to the valley of the next tooth, considerable clatter is experienced due to metal to metal contact and the sleeve 23 disclosed herein prevents such metal to metal contact, thereby cutting down clatter considerably.

Figure 5:
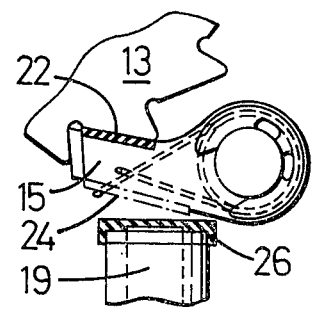
FIG. 5 is a view of an alternative embodiment.

Instead of providing a non-conductive sleeve 23, a rubber pad 22 may be provided on the face of the pawl 15 facing the wheel 13, as shown in FIG. 5. This pad may be moulded onto the pawl, or secured to it, e.g. by adhesive. A similar pad 24 may be provided on the opposite face of the pawl, which engages the coil plunger, or alternatively, the coil 19 itself may have a self-retaining rubber cap 26, or have a rubber disc mounted on its end face, e.g. by means of an adhesive.

Figure 3:
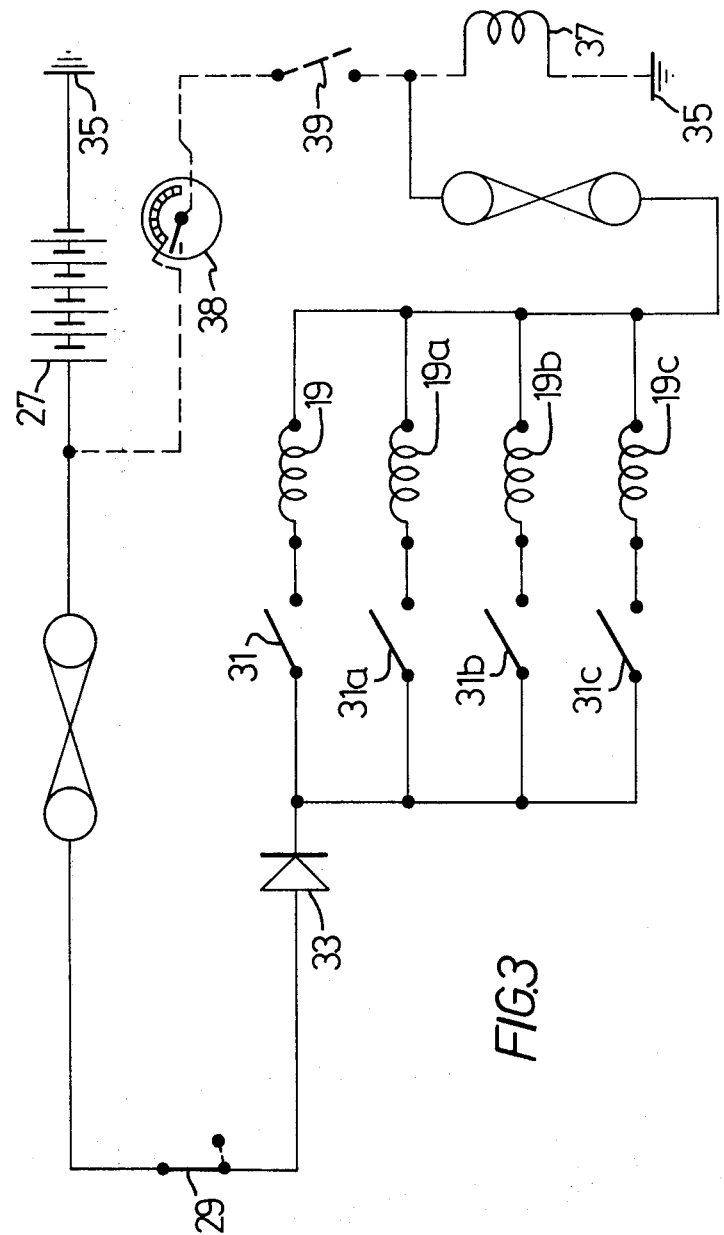
FIG. 3 is a simplified circuit diagram incorporating the reel of FIGS. 1 and 2.

The electrically operated reel shown in FIGS. 1 and 2 is preferably incorporated in an electrical circuit such as that shown in FIG. 3. Referring to FIG. 3, the circuit includes a 12 volt supply 27 which is in series with an inertia operated switch 29, a master switch 31 which may either be a seat operated switch, an ignition operated switch or some other type of master switch, and a diode 33. The circuit is suitably earthed at 35. The circuit also includes suitable fuses and is in series with the vehicle's brake lights 37.

Normally, the locking pawl 15 is biassed to the locking position shown in FIG. 1 thereby preventing unwinding of the safety belt webbing 5 from the spindle 3.

A further switch 38 associated with the vehicle's speed indicating and measuring device is arranged in parallel with a brake operated switch 39 and the switch 38 makes contact at a predetermined speed. The brake switch 39 has its contacts normally open, and that part of the circuit incorporating switches 38 and 39 is in parallel with the remainder of the circuit, between the supply 27 and brake lights 37 and acts as a shunt when the brake is depressed when the vehicle is travelling above said predetermined speed.

When the drive of the vehicle turns on the master switch 31 either by, for example, sitting on his seat to activate a switch or by operating the ingition switch, a current then flows to the coil 19 from the supply 27 through the mast switch 31, through the mercury switch 29 and to earth, thereby activating the coil and withdrawing the locking pawl 15 so that the drive of the vehicle can unwind the webbing 5 from the spindle 3 and fit his safety belt. As shown, the circuit also includes further master switches 31a, 31b, 31c and reel coils 19a, 19b, 19c in parallel with the master switch 31 and reel coil 19, but separate circuits can be used for each reel in the vehicle.

During normal movement of the vehicle, the wearers of the safety belts are free to move around in their seats because the coils 19, 19a, 19b, 19c will always be actuated to hold the pawls 15 in an unlocked position; but as soon as the inertia operated switch 29 is actuated, for example upon sudden deceleration of the vehicle or overturning of the vehicle, electrical contact at the switch 29 will be broken, thereby cutting off the electrical energy to the or each coil 19, and the or each spindle 3 will then be locked against webbing withdrawal because the pawl 15 will be sprung back into locking engagement with the wheel 13.

Furthermore, if the brake of the vehicle is actuated, and the vehicle is travelling above the predetermined speed at which the switch 38 makes contact, electrical contact at the brake switch 27 will be made with the result that that part of the circuit incorporating the mercury switch 29, and the or each coil 19 will be shunted, at the same time as the brake lights are illuminated, the coil will be starved of electricity and locking of the reel will occur. However, if the vehicle is travelling below a predetermined speed, e.g. 10 miles per hour, electrical current will not pass through the switch 38 and when the brakes are actuated the shunt part of the circuit will be ineffective. This has the advantage that in heavy congested, slow moving traffic and when the car is stationary the driver can press the brake without shunting the circuit and causing locking of the reel 19. This means the vehicle's driver is able to fit his safety belt, even if his foot is on the brake pedal when the vehicle is stationary.

It is appreciated that the above-described circuit is one of many which could be used with the electrically operated reel of the present invention.

Figure 4:
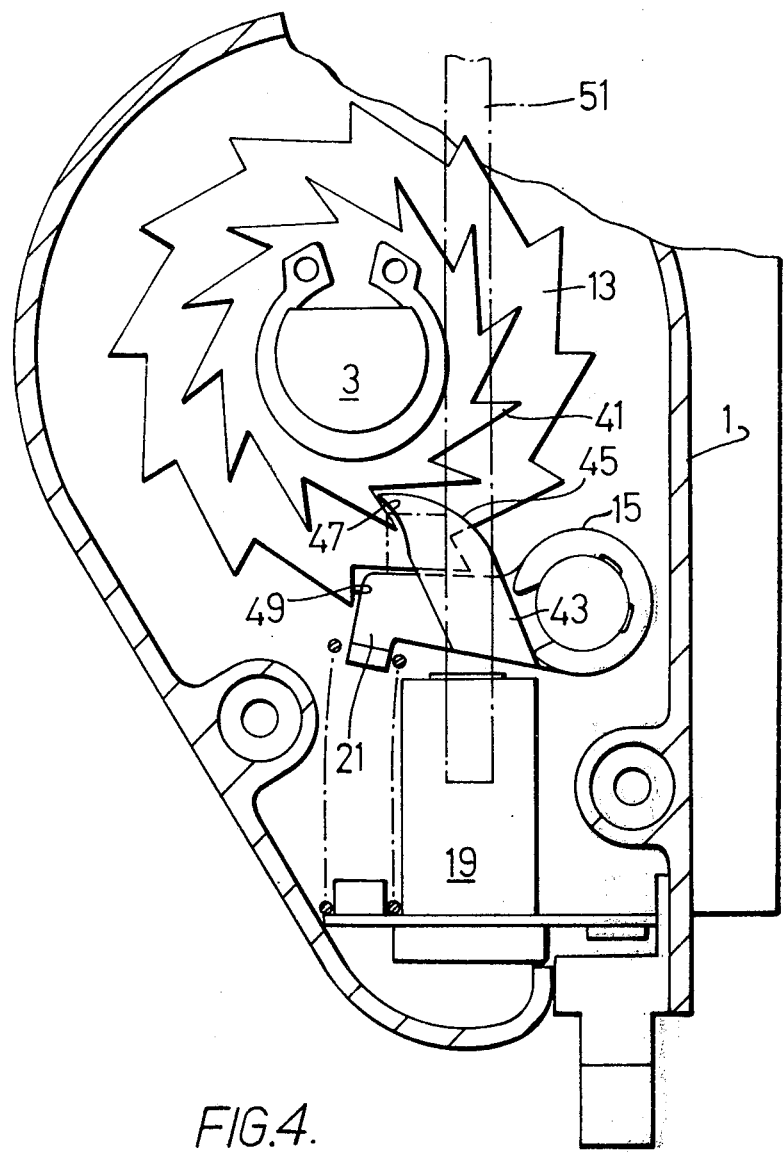
FIG. 4 is an enlarged, partly schematic, part sectional elevation of a preferred construction of reel, incorporating a double pawl and toothed wheel mechanism, and mechanical release device.

A modified construction of reel is illustrated in FIG. 4. It is envisaged that this construction could be employed in reels other than electrically operated ones.

Referring to FIG. 4, the reel is similar to the embodiment of FIGS. 1 and 2 and like parts have the same reference numerals. A secondary toothed wheel 41 is mounted for rotation with the spindle 3, and engageable with the wheel 41 is a secondary locking pawl 43 projecting from the pawl 15. The pawl 43 has a convex rear face 45 and a concave front face 47, the rear face 45 acting as a cam surface on any tooth of the wheel 41 to prevent edge engagement of the main pawl 15 with the main wheel 13. Furthermore, by making the teeth of the wheel 41 very pointed, and by virtue of the concave surface 47, once the two engage, there will be a tendency for the arm 21 of the main pawl 15 to be drawn radially in towards the spindle 3, with the result that the pawl is positively fed into engagement with the main wheel 13.

Preferably, the pawl 43 is formed of a resiliently deformable plastics material, and so arranged relatively the arm 21 of the main pawl that when fully engaged, the main pawl will be in mesh with wheel 13, but there will be a small gap 49, i.e. the two will not be engaged. Upon the reel being loaded due to tension in the belt, the pawl 43 will deform, thus closing gap 49 and allowing engagement of main pawl 15. This will happen at slow speed, and hence, operation will be very quiet.

There is also shown in FIG. 4 a manual release device, which can also be incorporated in the construction of FIGS. 1 and 2, or any other similar type of reel, and which can be used to override the electrical coil. If there is no supply of current to the coil, the pawl 15 will automatically move to a locking position. This could occur if there is an electrical fault, and would be undesirable. Normally, the safety belt would be unusable until the fault was repaired, but the release device makes it possible to use the reel as a spring loaded "static" type of belt. The release device merely comprises a spring biassed plunger 51 having a suitable cap (not shown) slidably mounted in the real casing, engageable adjacent its lower end with the arm 21 of the pawl 15, to move it against its spring bias, to a release position. This allows rotation of the spindle 3 and hence, the belt wound thereon can be unwound, the allow fitting of the belt. Once fitted, the plunger 51 can be released, and the belt will then automatically be locked against withdrawal, after any slack has been taken up. This means of course the belt can still be used, even when the electrical circuitry is malfunctioning. This could be of considerable benefit in the case of a country where it is cumpulsory to wear seat belts.

What is claimed is:

1. An electrically operated safety belt storage reel including a spindle on which a length of safety belt webbing is adapted to be wound, the reel being of the type which is for fitting in a vehicle and the webbing of which may be increased or decreased in length by pulling on the webbing to unwind it from the spindle, thereby allowing movement of the person wearing the belt during normal operating conditions of the vehicle, biasing means biasing the spindle so as normally to wind in a length of webbing mounted on the spindle, locking means normally locking the spindle so that when the locking means is in locking position rotation of the spindle is prevented thereby preventing unwinding of the webbing from the spindle, electrical means associated with the locking means for generating a magnetic field under the influence of which the locking means is moved between locking and unlocking positions, dependent upon a supply of electrical energy to the electrical means, and non-magnetic barrier means associated with the locking means for minimizing remanence in the locking means subsequent to the supply of electrical energy to the electrical means.

2. A safety belt storage reel as claimed in claim 1 wherein the spindle has a toothed wheel rotatable therewith and the locking means comprises a locking pawl movable into and out of engagement with the teeth of said toothed wheel and wherein the electrical means is a coil and the non-magnetic barrier comprises a cover sleeve on the arm of the locking pawl.

3. A safety belt storage reel as claimed in claim 1 wherein the spindle has a toothed wheel rotatable therewith and the locking means comprises a locking pawl movable into and out of engagement with the teeth of said toothed wheel and wherein the electrical means is a coil and the non-magnetic barrier is in two parts.

4. A safety belt storage reel as claimed in claim 3 wherein one part of the barrier is on a face of the pawl facing the toothed wheel and the other part is on the opposite face of the pawl.

5. A safety belt storage reel as claimed in claim 3 wherein one of the parts is on a face of the pawl facing the toothed wheel and the other is arranged over the end of the coil facing the pawl.

6. A safety belt storage reel as claimed in claim 5 wherein the other part comprises a rubber disc secured to said end.

7. A safety belt storage reel as claimed in claim 5 wherein the other part is in the form of a self-retaining cap.

8. A safety belt storage reel as claimed in claim 1 wherein said biasing means bias the pawl into locking engagement with the toothed wheel and the pawl is moved out of such locking engagement upon electrical energy being supplied to the coil.

9. A safety belt storage reel as claimed in claim 1 including a double toothed wheel fast with the reel spindle and a double locking pawl associated with it, the main locking pawl having a secondary pawl attached thereto and engageable with a secondary toothed wheel formed on the face of the main toothed wheel and so constructed as to lead the main pawl into correct locking engagement with the main toothed wheel and prevent edge engagement.

10. A safety belt storage reel as claimed in claim 9 wherein the secondary pawl is formed of resiliently deformable material and is arranged to engage its secondary wheel prior to engagement of the main pawl and wheel whereby upon a load being applied to the reel, the secondary pawl will be deformed and the main pawl and wheel will engage.

11. A safety belt storage reel as claimed in claim 1 including a mechanical release device to release the reel from a locked condition.

12. A safety belt storage reel as claimed in claim 11 wherein the mechanical release device comprises a plunger mounted in the casing of the reel adjacent the coil and locking pawl and having an arm engageable with the pawl on depression of the plunger to release the pawl against the bias of said biasing means, thus permitting belt withdrawal.

13. An electrical circuit for operating one or more safety belt storage reels including a safety belt storage reel as claimed in claim 1 and an inertia operated switch of the type which is actuated upon sudden acceleration, deceleration or tilting of a vehicle in which the switch is mounted.

14. An electrical circuit as claimed in claim 13 wherein the switch is normally closed and is caused to open by said acceleration, deceleration or tilting movement.

15. An electrical circuit as claimed in claim 13 and including a master switch.

16. An electrical circuit as claimed in claim 13 and including a further switch operated by depression of a vehicle's brake pedal to break the circuit.

17. An electrical circuit as claimed in claim 16 in which the foot brake actuated switch has means associated with it dependent upon the speed of the vehicle such that below a predetermined speed operation of the vehicle's foot brake is not effective to break the circuit.

* * * * *